United States Patent
Iwasaki

(10) Patent No.: US 8,064,146 B2
(45) Date of Patent: Nov. 22, 2011

(54) IMAGE PICKUP APPARATUS

(75) Inventor: Keiichi Iwasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/825,580

(22) Filed: Jul. 6, 2007

(65) Prior Publication Data

US 2008/0024883 A1 Jan. 31, 2008

(30) Foreign Application Priority Data

Jul. 28, 2006 (JP) ................ P2006-206344
Jul. 28, 2006 (JP) ................ P2006-206408

(51) Int. Cl.
*G02B 15/14* (2006.01)
*G02B 7/02* (2006.01)
*G03B 17/00* (2006.01)
*H04N 5/225* (2006.01)

(52) U.S. Cl. ......... 359/703; 359/808; 396/542; 348/374

(58) Field of Classification Search .......... 359/703, 359/808–809, 811, 818–819, 822; 396/529, 396/532, 535, 542; 348/208.99, 294, 335, 348/340, 373–374, 376
See application file for complete search history.

(56) References Cited

U.S. PATENT DOCUMENTS

| | | | | |
|---|---|---|---|---|
| 5,400,072 A | * | 3/1995 | Izumi et al. ............ | 348/335 |
| 6,144,504 A | * | 11/2000 | Sudoh et al. ........... | 359/811 |
| 7,609,461 B1 | * | 10/2009 | Webster et al. ......... | 359/811 |
| 2006/0181633 A1 | * | 8/2006 | Seo ....................... | 348/340 |

FOREIGN PATENT DOCUMENTS

| | | |
|---|---|---|
| JP | 07-209714 | 8/1995 |
| JP | 2001-124970 | 5/2001 |
| JP | 2002-090603 | 3/2002 |
| JP | 2002-314857 | 10/2002 |
| JP | 2004-080774 | 3/2004 |
| JP | 2004-112203 | 4/2004 |
| JP | 2005-250348 | 9/2005 |
| JP | 2005-266276 | 9/2005 |
| JP | 2005-303550 | 10/2005 |
| JP | 2006-086672 | 3/2006 |
| JP | 2006-128755 | 5/2006 |

* cited by examiner

*Primary Examiner* — Dawayne Pinkney
(74) *Attorney, Agent, or Firm* — Robert J. Depke; Rockey, Depke & Lyons, LLC

(57) ABSTRACT

An image pickup apparatus includes a housing, a lens incorporated in the front of the housing and configured to constitute an imaging optical system, an image pickup device provided in the housing and configured to capture a subject image guided by the imaging optical system, a printed wiring board provided in the housing and having the image pickup device mounted thereon, a barrel provided integrally with the front of the housing, an annular lens cover configured to push a face of the lens facing forward in a rearward direction, and detachably mounted on the front of the barrel, and a support wall projecting rearward outside a rear end of the barrel in the radial direction and inside the housing, and bonded to the printed wiring board with adhesive.

18 Claims, 4 Drawing Sheets

IMAGE PICKUP APPARATUS

CROSS REFERENCES TO RELATED APPLICATIONS

The present invention contains subject matter related to Japanese Patent Application JP 2006-206344 filed in the Japanese Patent Office on Jul. 28, 2006 and Japanese Patent Application JP 2006-206408 filed in the Japanese Patent Office on Jul. 28, 2006, the entire contents of which are incorporated herein by reference.

BACKGROUND OF THE INVENTION

1. Field of the Invention

The present invention relates to an image pickup apparatus.

2. Description of the Related Art

Image pickup apparatuses having an image pickup device, such as a CCD image sensor or a CMOS image sensor, have been proposed.

These image pickup apparatuses are used as digital still cameras or video cameras, car-mounted cameras mounted outside a car body or inside a cabin, as outside surveillance cameras.

Most image pickup apparatuses used as car-mounted cameras or surveillance cameras include a housing serving as an outer casing, a barrel incorporated in the housing, a lens incorporated in the barrel so as to constitute an imaging optical system, and an image pickup device provided in the housing so as to capture a subject image guided by the imaging optical system, for example, as disclosed in Japanese Unexamined Patent Application Publication No. 2005-266276.

FIG. 4 shows an image pickup apparatus 10' disclosed in the above-described publication. The image pickup apparatus 10' includes a housing 50 serving as an outer casing, a barrel 52 incorporated in the housing 50, a lens 54 incorporated in the barrel 52 so as to constitute an imaging optical system, an image pickup device 56 provided in the housing 50 so as to capture a subject image guided by the imaging optical system, and a lens cover 58 screwed on the front of the barrel 52 so as to fix the lens 54 to the barrel 52.

The image pickup device 56 is mounted on a printed wiring board 64 that is screwed to the housing 50.

In order to adjust the distance between the lens 54 and the image pickup device 56 during assembly of the image pickup apparatus 10', an external thread 5202 provided on the barrel 52 is coupled to an internal thread 5002 provided on the housing 50 by screwing.

Further, in order to ensure resistance to water, a first O-ring 60 is provided between the lens 54 and the barrel 52, and a second O-ring 62 is provided between the barrel 52 and the housing 50.

In this image pickup apparatus 10', the image pickup device 56 is provided inside the housing 50 and on the rear side of the barrel 52, and a space is provided in the housing 50 between a rear end of the barrel 52 and the image pickup device 56.

SUMMARY OF THE INVENTION

Accordingly, since the housing 50 and the barrel 52 are separately provided in the known image pickup apparatus 10', the number of components is increased, and the configuration of the apparatus 10 is complicated.

Further, the printed wiring board 64 is screwed to the housing 50, and the image pickup device 56 is thereby fixed to the housing 50. For this reason, in order to adjust the distance between the lens 54 and the image pickup device 56, the external thread 5202 of the barrel 52 is screwed in the internal thread 5002 of the housing 50 by rotating the barrel 52. This lowers the degree of flexibility in positioning the image pickup device 56 relative to the lens 54.

Moreover, since the housing 50 and the barrel 52 are separately provided, the first and second O-rings 60 and 62 are respectively provided between the lens 54 and the barrel 52 and between the barrel 52 and the housing 50 in order to ensure resistance to water. Consequently, the configuration is complicated.

In addition, dust in the housing 50 adheres to a rear end face of the lens 54 or a cover glass of the image pickup device 56. This lowers the quality of captured images.

The present invention has been made in view of these circumferences. It is desirable to provide an image pickup apparatus that reduces the size and cost by reducing the number of components, simplifying the configuration, and ensuring a high degree of flexibility in positioning an image pickup device relative to a lens, and that improves the quality of captured image by preventing dust in a housing from adhering to a rear end face of the lens or a cover glass of the image pickup device.

An image pickup apparatus according to an embodiment of the present invention includes a housing serving as an outer casing; a lens incorporated in the front of the housing and configured to constitute an imaging optical system; an image pickup device provided in the housing and configured to capture a subject image guided by the imaging optical system; a printed wiring board provided in the housing and having the image pickup device mounted thereon; a barrel provided integrally with the front of the housing, the barrel including an inner peripheral face to be engaged with an outer peripheral face of the lens with no play therebetween, and a contact face to be in contact with an end face of the lens facing rearward; an annular lens cover configured to push a face of the lens facing forward in a rearward direction so that the lens is held between the lens cover and the contact face in a state in which the lens is stored in the barrel, the lens cover being detachably mounted on the front of the barrel; and a support wall projecting rearward outside a rear end of the barrel in the radial direction and inside the housing, the support wall being bonded to the printed wiring board with adhesive.

An image pickup apparatus according to another embodiment of the present invention includes a housing serving as an outer casing; a barrel provided at the front of the housing and configured to support an imaging optical system; an image pickup device provided inside the housing and on a rear side of the barrel and configured to capture a subject image guided by the imaging optical system, the image pickup device including a package having a storage recess, an image sensor portion mounted in the storage recess with an imaging surface thereof facing an aperture of the storage recess, and a transparent cover plate configured to close the aperture and tightly seal the storage recess, the cover plate facing the rear of the barrel; and an enclosing portion extending between the periphery of the rear of the barrel and the periphery of the cover plate, and configured to enclose an optical path of the imaging optical system extending from the rear of the barrel to the cover plate.

According to the embodiments of the present invention, the barrel accommodating the lens is provided integrally with the housing, and the lens is held in the barrel with the lens cover. Therefore, the configuration is simplified, and the number of components is reduced. This is advantageous in size reduction and cost reduction.

Since the printed wiring board on which the image pickup device is mounted is bonded to the support wall with the adhesive, the degree of flexibility in positioning the image pickup device relative to the lens can be increased.

Since a single sealing material is simply placed between the lens and the barrel in order to ensure water resistance, the configuration can be simplified and cost reduction is achieved while ensuring water resistance.

Further, since dust in the housing is prevented by the enclosing portion from entering the optical path, it is possible to reliably prevent dust from adhering to the rear end face of the lens or the surface of the cover plate. This can improve the quality of images captured by the image sensor portion.

DESCRIPTION OF THE PREFERRED EMBODIMENTS

An embodiment of the present invention will now be described with reference to the drawings.

Figure 1:
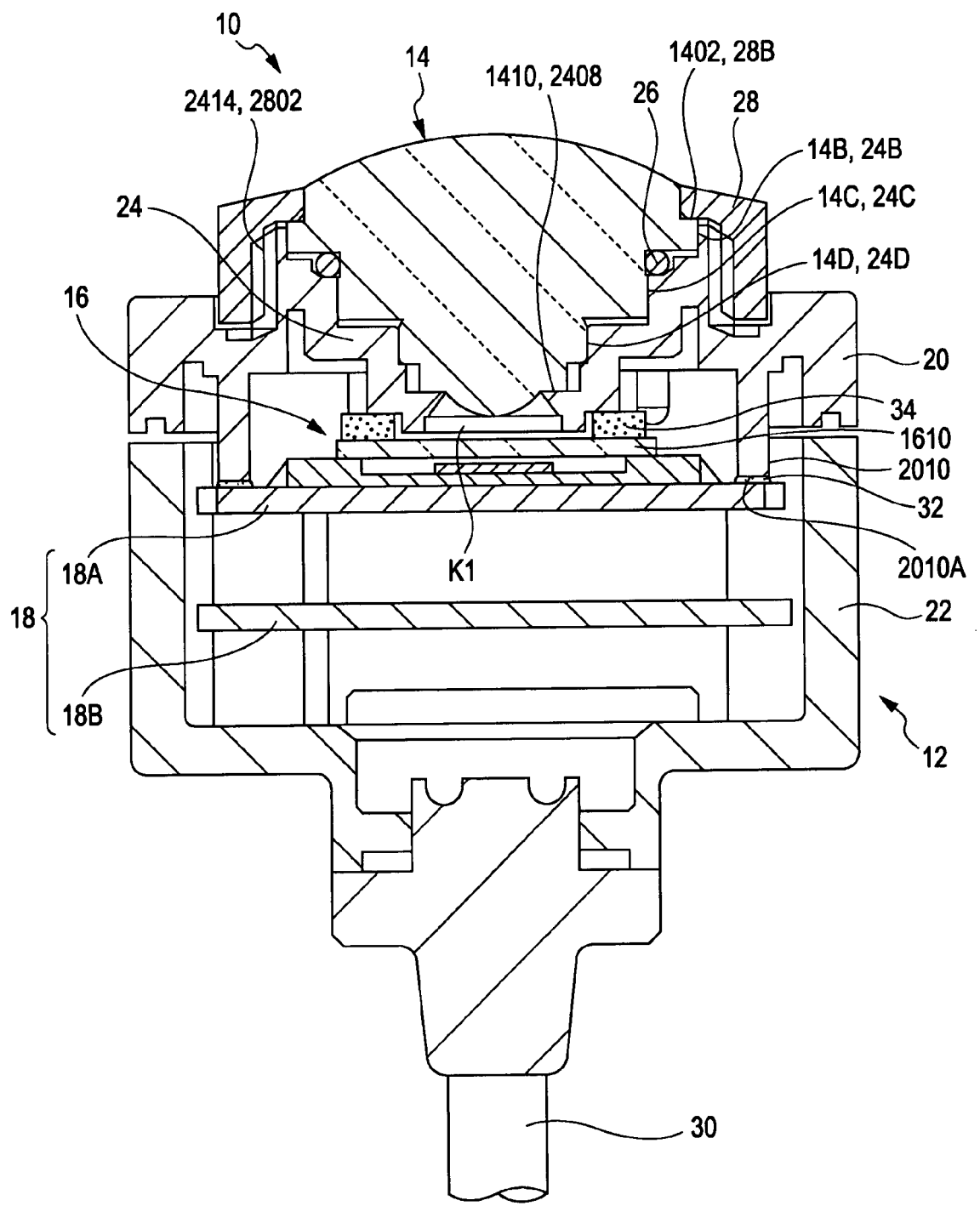
FIG. 1 is a cross-sectional view showing the overall configuration of an image pickup apparatus according to an embodiment of the present invention.
Figure 2:
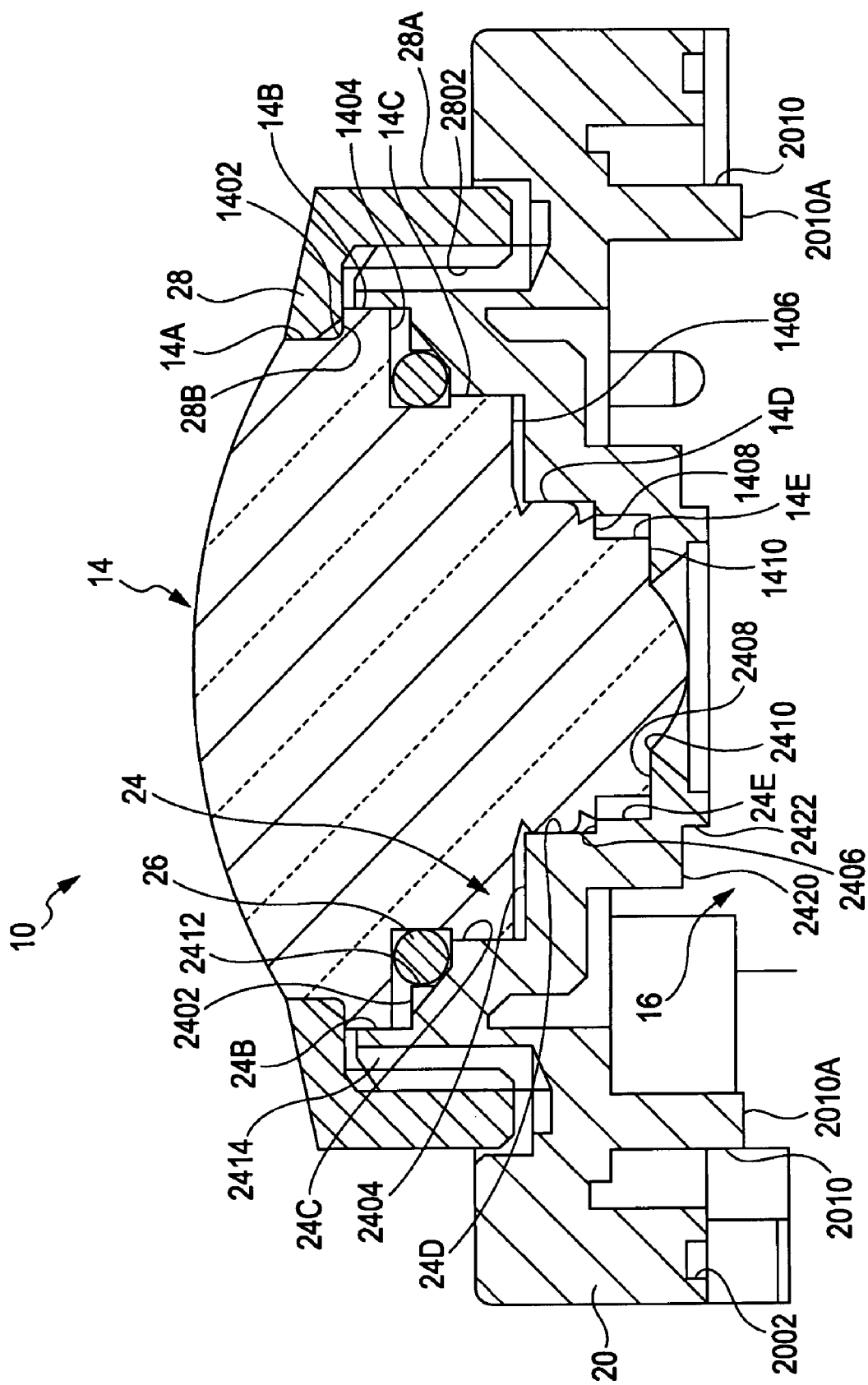
FIG. 2 is a cross-sectional view of the image pickup apparatus before an image pickup device and a printed wiring board are mounted.
Figure 3:
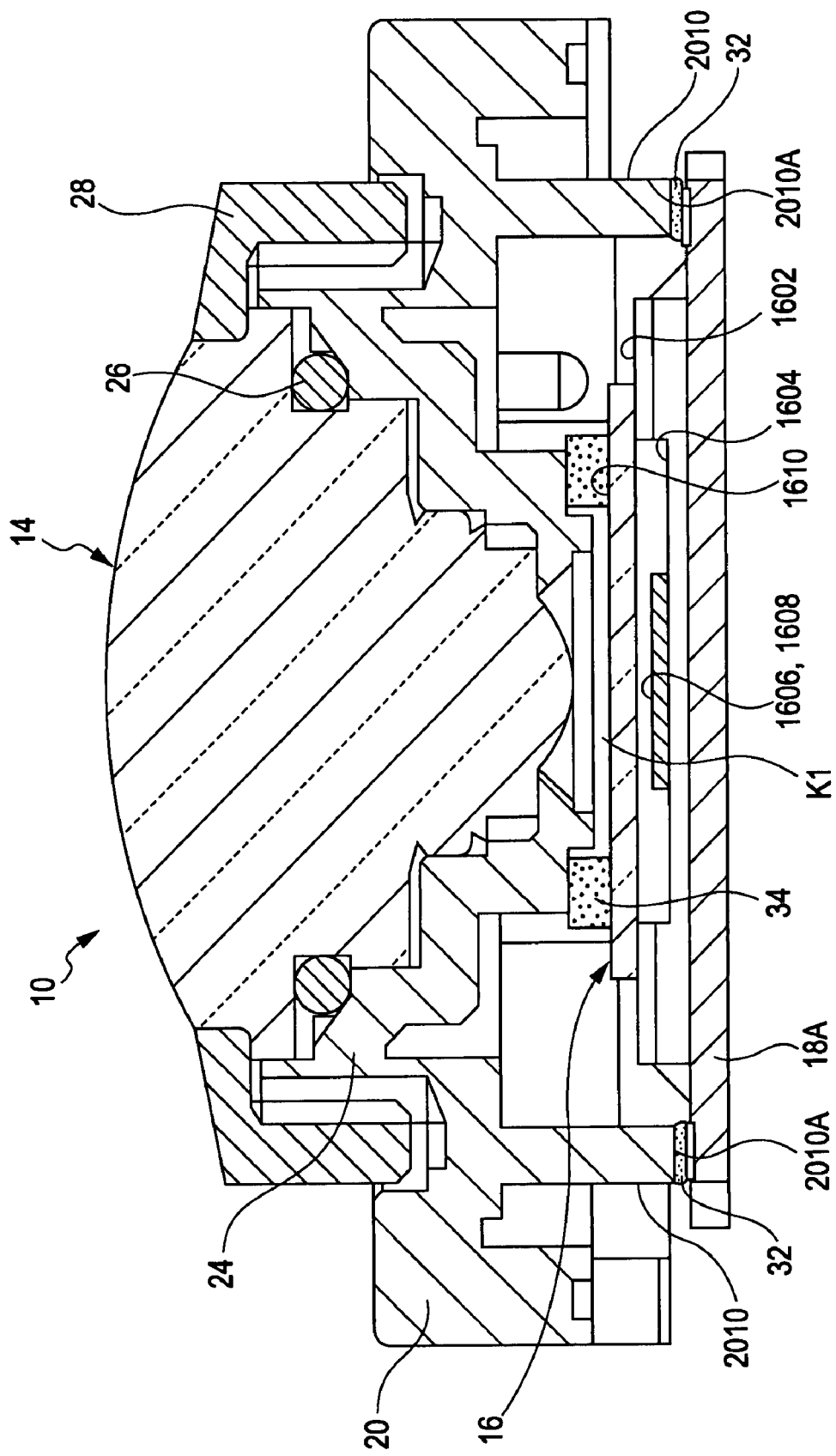
FIG. 3 is a cross-sectional view of the image pickup apparatus after the image pickup device and the printed wiring board are mounted.
Figure 4:
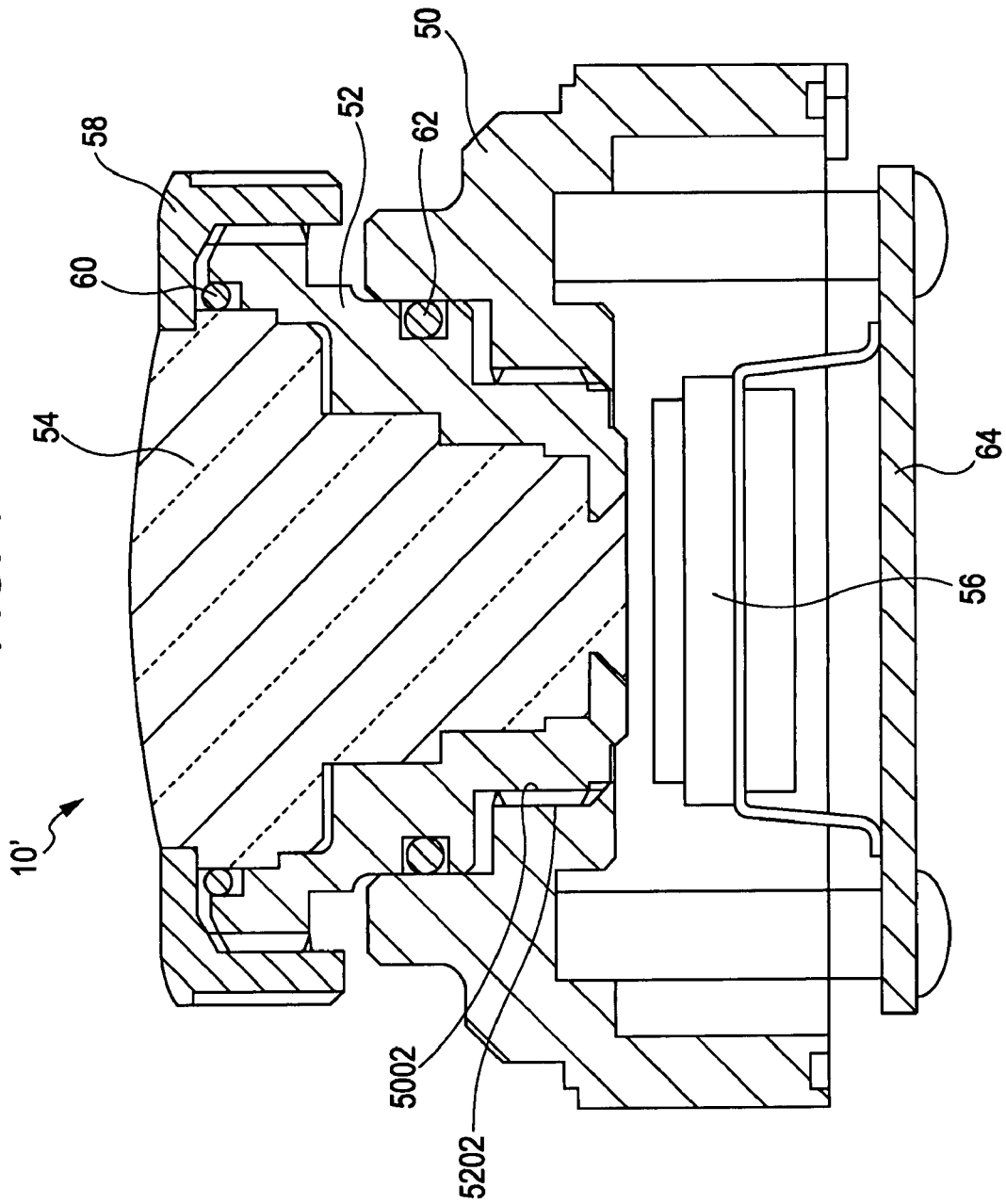
FIG. 4 is a cross-sectional view of a known image pickup apparatus.

FIG. 1 is a cross-sectional view showing the overall configuration of an image pickup apparatus 10 according to an embodiment of the present invention. FIG. 2 is a cross-sectional view of the image pickup apparatus 10 before an image pickup device 16 and a printed wiring board 18 are mounted. FIG. 3 is a cross-sectional view of the image pickup apparatus 10 after the image pickup device 16 and the printed wiring board 18 are mounted.

The image pickup apparatus 10 shown in FIG. 1 is used, for example, as a car-mounted camera mounted outside a car body or inside a car cabin, or as an outside surveillance camera.

As shown in FIG. 1, the image pickup apparatus 10 includes a housing 12, a lens 14, an image pickup device 16, and a printed wiring board 18.

In this specification, a side close to a subject in the optical axis direction of an image capturing optical system is referred to as a front side, and a side close to the image pickup device 16 is referred to as a rear side.

The housing 12 serves as an outer casing, and includes a front case 20 and a rear case 22 that are coupled detachably. The front case 20 and the rear case 22 are formed of synthetic resin.

The lens 14 is provided in the front case 20, and the image pickup device 16 and the printed wiring board 18 are provided in the rear case 22.

The lens 14 guides a subject image to the image pickup device 16, and includes a plurality of lenses arranged along the optical axis in this embodiment. For simple illustration, a plurality of lenses are shown as a single lens in FIGS. 1 to 3. At least the frontmost lens is formed of glass, and the other lenses can be formed by glass or synthetic resin. The lens 14 can be formed of a single lens.

As shown in FIG. 2, the lens 14 has first to fifth outer peripheral faces 14A to 14E that are arranged in that order from the front side to the rear side.

An annular end face 1402 facing forward is provided at the boundary between the first outer peripheral face 14A and the second outer peripheral face 14B.

An annular end face 1404 facing rearward is provided at the boundary between the second outer peripheral face 14B and the third outer peripheral face 14C, an annular end face 1406 facing rearward is provided at the boundary between the third outer peripheral face 14C and the fourth outer peripheral face 14D, an annular end face 1408 facing rearward is provided at the boundary between the fourth outer peripheral face 14D and the fifth outer peripheral face 14E, and an annular end face 1410 facing rearward is connected to a rear end of the fifth outer peripheral face 14E.

A barrel 24 is provided integrally with the front of the front case 20.

As shown in FIG. 2, the barrel 24 has second to fifth inner peripheral faces 24B to 24E that are arranged in that order from the front side to the rear side.

The second inner peripheral face 24B is engaged with the second outer peripheral face 14B of the lens 14 with no play therebetween, the third inner peripheral face 24C is engaged with the third outer peripheral face 14C with no play therebetween, and the fourth inner peripheral face 24D is engaged with the fourth outer peripheral face 14D with not play therebetween.

Further, in the barrel 24, an annular end face 2402 facing forward is provided at the boundary between the second inner peripheral face 24B and the third inner peripheral face 24C, an annular end face 2404 facing forward is provided at the boundary between the third inner peripheral face 24C and the fourth inner peripheral face 24D, an annular end face 2406 facing forward is provided at the boundary between the fourth inner peripheral face 24D and the fifth inner peripheral face 24E, and an annular contact face 2408 facing forward is provided at a rear end of the fifth inner peripheral face 24E. An aperture 2410 is provided inside the contact face 2408.

A groove 2412 in which an O-ring is fitted is provided at the intersection of a front end of the third inner peripheral face 24C and an inner end of the end face 2402.

An external thread 2414 is provided on the outer periphery of the front of the barrel 24.

A rear end face of the front case 20 and a front end face of the rear case 22 are coupled. A sealing-material fitting groove 2002 is provided over the entire periphery of the rear end face of the front case 20 so that the rear end face of the front case 20 is coupled to the front end face of the rear case 22 in a watertight manner. The rear end face of the front case 20 and the front end face of the rear case 22 can be coupled by various known coupling structures, for example, by coupling a plurality of bosses projecting from the outer peripheral faces of both the cases 20 and 22 by screws. A sealing material, such as an O-ring, is fitted in the sealing-material fitting groove 2002 during coupling.

An annular lens cover 28 is detachably mounted on the front of the barrel 24. The lens cover 28 includes a cylindrical portion 28A and a contact portion 28B, and is formed of synthetic resin. The cylindrical portion 28A has an internal thread 2802 to be screwed on the external thread 2414 of the barrel 24. The contact portion 28B is provided at a front end of the cylindrical portion 28A, and is shaped like an annular plate that is in contact with the annular end face 1402 facing forward in the lens 14 stored in the barrel 24.

Two support walls 2010 project rearward from portions outside the rear end of the barrel 24 in the radial direction and inside the front case 20. The support walls 2010 are provided so that the rear end of the barrel 24 is disposed therebetween. A rear end of each of the support walls 2010 protrudes rearward from the rear end of the front case 20, and has a rear end face 2010A extending on a plane orthogonal to the optical axis of the image capturing optical system.

The lens 14 is positioned in the direction orthogonal to the optical axis by respectively engaging the second, third, and fourth outer peripheral faces 14B, 14C, and 14D with the second, third, and fourth inner peripheral faces 24B, 24C, and 24D of the barrel 24.

In this case, a sealing material 26 formed of an O-ring is fitted in the groove 2412 of the barrel 24. The sealing material 24 is mounted between the end face 1404 of the lens 14 and the groove 2412 in a manner such as to extend over the entire outer periphery of the lens 14.

By screwing the internal thread 2802 of the lens cover 28 on the external thread 2414 of the barrel 24, the contact portion 28B pushes the end face 1402 of the lens 14 rearward, compresses the sealing material 26, and presses the end face 1410 of the lens 14 against the contact face 2408. The lens 14 is thereby positioned in the optical axis direction. Therefore, the lens 14 is held between the contact portion 28B of the lens cover 28 and the contact face 2408 of the barrel 24.

As shown in FIG. 3, the image pickup device 16 is a known solid-state image pickup device such as a CCD image sensor or a CMOS image sensor. In the image pickup device 16, a subject image guided by the lens 14 is formed on an imaging surface (light-receiving surface) 1606, and is captured thereat. The image pickup device 16 outputs an image signal corresponding to the captured image.

More specifically, the image pickup device 16 includes a package 1602 shaped like a rectangular plate, a storage recess 1604 opened in one surface (front surface) of the package 1602 in the thickness direction, an image sensor portion 1608 mounted on a bottom face of the storage recess 1604 and including the imaging surface 1606, and a transparent cover plate (cover glass) 1610 bonded to the front surface of the package 1602 so as to cover and tightly seal the storage recess 1604.

The image pickup device 16 is mounted on the printed wiring board 18. The printed wiring board 18 includes a signal processing circuit that supplies power and driving signals to the image pickup device 16 and that generates a picture signal by subjecting an image signal from the image pickup device 16 to predetermined signal processing.

In this embodiment, as shown in FIG. 1, the printed wiring board 18 includes a first substrate 18A mounted on the other surface (rear surface) of the package 1602 of the image pickup device 16 in the thickness direction, and a second substrate 18B provided on the rear side of the first substrate 18A and having the signal processing circuit. The first and second substrates 18A and 18B are electrically connected by a wiring material (not shown).

The second substrate 18B is mounted in the rear case 22. One end of a cable 30 is electrically connected to the second substrate 18B. The above-described image signal is supplied via the cable 30 to an external image display connected to the other end of the cable 30.

The first substrate 18A is bonded to the rear end faces 2010A of the two support walls 2010 with adhesive 32. For bonding, the following adjusting operation is performed.

As shown in FIG. 3, the first substrate 18A and the front case 20 are supported by an adjusting jig (not shown). The adjusting jig holds the first substrate 18A, that is, the imaging surface 1606 of the image pickup device 16 so that imaging surface 1606 can move along the optical axis of the lens 14 and a direction orthogonal to the optical axis, can rotate about the optical axis, and can tilt relative to the optical axis.

First, a chart having a predetermined test image is placed in front of the lens 14, and the test image is formed on the imaging surface 1606 by the lens 14.

Then, the optical characteristic of the lens 14 is measured on the basis of data on the image captured by the image pickup device 16. For example, the optical characteristics can include MTF (modulation transfer function).

Subsequently, the first substrate 18A is shifted or tilted in the above-described directions by the adjusting jig so that the optical characteristic of the lens 14 is improved, in other words, so that the subject image guided by the lens 14 is properly formed on the center of the imaging surface 1606 of the image pickup device 16 (the subject image is focused on the center of the imaging surface 1606 without being distorted).

When the optimum optical characteristic is obtained, the adhesive 32 is applied and cured between the first substrate 18A and the rear end faces 2010A of the support walls 2010, so that the first substrate 18A is fixed to the front case 20. Various known adhesives can be used as the adhesive 32. In this embodiment, an ultraviolet-curing adhesive is applied between the first substrate 18A and the rear end faces 2010A of the support walls 2010 and is cured by ultraviolet radiation so that the first substrate 18A is fixed to the front case 20.

According to this embodiment, the barrel 24 accommodating the lens 14 is provided integrally with the front case 20, the lens 14 is held in the barrel 24 with the lens cover 28, and the first substrate 18A on which the image pickup device 16 is mounted is bonded to the rear end faces 2010A of the support walls 2010 with the adhesive 32. Therefore, the configuration of the apparatus is simplified, and the number of components is reduced. This is advantageous in size reduction and cost reduction.

Further, in order to ensure water resistance, the single sealing material 26 is simply placed between the lens 14 and the barrel 24. Therefore, a simpler configuration and a lower cost can be achieved while ensuring water resistance.

Since the first substrate 18A having the image pickup device 16 is bonded to the rear end faces 2010A of the support walls 2010 with the adhesive 32, it can be attached to the front case 20 after the position and attitude of the image pickup device 16 are adjusted. Therefore, the degree of flexibility in adjusting the image pickup device 16 can be made high than in the case in which the distance between the lens and the image pickup device is adjusted by screwing the external thread of the barrel in the internal thread of the housing. This improves the optical characteristic of the lens 14, and allows a subject image to be properly focused on the image pickup device 16.

Further, since at least the forefront lens of a plurality of lenses provided in the lens 14 is formed of glass, durability of the lens 14 can be ensured without placing any protective cover in front of the lens 14. This can simplify the configuration.

The principal part of the present invention will now be described.

As shown in FIG. 3, the image pickup device 16 includes the package 1602 having the storage recess 1604, the image sensor portion 1608 mounted in the storage recess 1604 such that the imaging surface 1606 faces the aperture of the storage recess 1604, and the transparent cover plate 1610 that closes the aperture and tightly seals the storage recess 1604.

The cover plate 1610 can be formed of various known materials such as transparent glass and synthetic resin. In this embodiment, the cover plate 1610 is formed of a glass plate (cover glass).

The cover plate 1610 faces the rear of the barrel 24. More specifically, the cover plate 1610 extends on a plane orthogonal to the optical axis of the imaging optical system.

As shown in FIG. 2, an annular end face 2420 facing the cover plate 1610 in parallel and an outer peripheral face 2422 projecting from the inner periphery of the end face 2420 toward the cover plate 1610 are provided at the rear of the barrel 24.

As shown in FIGS. 1 and 3, an enclosing portion 34 extends between the rear periphery of the barrel 24 and the periphery of the cover plate 1610, and encloses an optical path portion K1 of the imaging optical system extending from the rear of the barrel 24 to the cover plate 1610.

The enclosing portion 34 prevents dust in the housing 12 from entering the optical path portion K1. The enclosing portion 34 is provided between the end face 2420 and the cover plate 1610 and outside the outer peripheral face 2422 in the radial direction, and can be formed of, for example, an elastically deformable annular member made of an elastic material such as rubber.

Alternatively, the enclosing portion 34 can be formed of an annular member made of foam (cushioning material of foam) that is not air-permeable, for example, urethane foam or rubber foam, formed of an annular member made of adhesive paper, or formed of adhesive.

When the enclosing portion 34 is formed of the above-described elastic material, foam, or adhesive, this material is not air-permeable, and therefore, the optical path portion K1 is sealed hermetically.

When the enclosing portion 34 is formed of paper, air flows between the interior of the housing 12 and the optical path portion K1, but dust is prevented from entering the optical path portion K1.

The shape of the enclosing portion 34 is not particularly limited. The enclosing portion 34 can have any shape that can enclose the optical path portion K1, for example, can be shaped like a circle or a polygon.

According to embodiment of the present invention, the enclosing portion 34 encloses the optical path portion K1 of the imaging optical system extending from the rear of the barrel 24 to the cover plate 1610. Since dust is prevented by the enclosing portion 34 from entering the optical path portion K1, it is possible to reliably prevent dust from adhering to the rear end face of the lens 14 or the surface of the cover plate 1610. This can improve the quality of images captured by the image sensor portion 1608.

The above-described advantage can be achieved with an extremely simple structure, that is, by the enclosing portion 34.

When the optical path portion K1 is hermetically sealed by the enclosing portion 34 that is formed of a non-permeable material, even if the temperature of air in the housing 12 rises, the enclosing portion 34 prevents the heated air from entering the optical path portion K1. Therefore, it is possible to reliably prevent dew condensation from being caused by the temperature difference between the heated air and the rear end face of the lens 14 or the surface of the cover plate 1610. This can improve the quality of images captured by the image sensor portion 1608.

While the image pickup apparatus 10 is a car-mounted camera or a surveillance camera in the above-described embodiment, the present invention can be widely applied to various image pickup apparatuses, for example, portable information devices such as a PDA, a notebook personal computer, and a camera-equipped mobile telephone, a digital still camera, or a video camera.

It should be understood by those skilled in the art that various modifications, combinations, sub-combinations and alternations may occur depending on design requirements and other factors insofar as they are within the scope of the appended claims or the equivalents thereof.

What is claimed is:

1. An image pickup apparatus comprising:
   a housing;
   a lens incorporated in the front of the housing and configured as an imaging optical system;
   an image pickup device provided in the housing and configured to capture a subject image guided by the imaging optical system;
   a barrel including an inner peripheral face adjacent an outer peripheral lens portion, and wherein the barrel is comprised of a continuous body of material that also forms part of the housing;
   and a first seal member provided between the barrel and the lens, the first seal being compressed between the lens and barrel by application of force on the lens; and
   a sealed recess having the image pickup device located therein and wherein a second seal member is located between the barrel and the sealed recess, and further wherein the second seal is in contact with an outer surface of the barrel; and
   wherein the housing includes a front case and a rear case, and a rear end of the front case and a front end of the rear case are coupled detachably,
   wherein the barrel and the support wall are provided integrally with the front case,
   wherein the printed wiring board is bonded to a rear end of the support wall, and
   wherein the rear end of the support wall protrudes rearward from the rear end of the front case.

2. The image pickup apparatus according to claim 1, wherein a support wall includes two support walls provided such that the rear end of the barrel is disposed therebetween.

3. The image pickup apparatus according to claim 1,
   wherein the rear of the support wall has a rear end face extending on a plane orthogonal to an optical axis of the imaging optical system, and
   wherein the printed wiring board is bonded to the rear end face with adhesive.

4. The image pickup apparatus according to claim 1, wherein a position of the printed wiring board is adjusted along the optical axis of the lens and in a direction orthogonal to the optical axis so that the subject image guided by the lens is focused on the center of an imaging surface of the image pickup device.

5. The image pickup apparatus according to claim 1, wherein the lens includes a single lens formed of glass.

6. The image pickup apparatus according to claim 1, wherein the lens includes a plurality of lenses, and the forefront one of the lenses is formed of glass.

7. The image pickup apparatus according to claim 1, wherein the lens cover includes:
   a cylindrical portion having an internal thread to be screwed on an external thread provided on the periphery of the front of the barrel; and
   an annular contact portion provided at a front end of the cylindrical portion in contact with an outer peripheral face of a front face of the lens facing forward.

8. An image pickup apparatus comprising:
a housing;
a lens incorporated in the front of the housing and configured as an imaging optical system;
an image pickup device provided in the housing and configured to capture a subject image guided by the imagine optical system;
a barrel including an inner peripheral face adjacent an outer peripheral lens portion, and wherein the barrel is comprised of a continuous body of material that also forms part of the housing;
and a first seal member provided between the barrel and the lens, the first seal being compressed between the lens and barrel by application of force on the lens: and
a sealed recess having the image pickup device located therein and wherein a second seal member is located between the barrel and the sealed recess, and further wherein the second seal is in contact with an outer surface of the barrel, further comprising:
a sealing material extending over the entire periphery of the lens, the sealing material being compressed in a front-rear direction in a state in which the lens is held in the barrel by the lens cover.

9. An image pickup apparatus comprising:
a housing;
a barrel provided at the front of the housing and configured to support an imaging optical system, and wherein the barrel is comprised of a continuous body of material that also forms part of the housing;
an annular lens mounted on the barrel;
an image pickup device provided inside the housing and supported by a rear side of the barrel and configured to capture a subject image guided by the imaging optical system, the image pickup device located in a sealed recess, an image sensor portion mounted in the sealed recess with an imaging surface thereof facing an aperture of the recess, and a transparent cover plate configured to close the aperture and tightly seal the recess; and
a first seal member provided between the barrel and the annular lens, the first seal being compressed between the lens and barrel by application of force on the annular lens and wherein a second seal member is located between the barrel and the sealed recess, and further wherein the second seal is in contact with an outer surface of the barrel, further comprising:
a printed wiring board on which the image pickup device is mounted; and
a support wall projecting rearward outside the rear of the barrel in the radial direction and inside the housing,
wherein the housing includes a front case and a rear case, and a rear end of the front case and a front end of the rear case are detachably coupled,
wherein the barrel is provided integrally with the front case,
wherein the printed wiring board is bonded to a rear end of the support wall with adhesive, and
wherein the rear end of the support wall protrudes rearward from the rear end of the front case.

10. The image pickup apparatus according to claim 9, wherein the enclosing portion is formed of an elastically deformable annular material.

11. The image pickup apparatus according to claim 9, wherein the enclosing portion is formed of an annular foam material.

12. The image pickup apparatus according to claim 9, wherein the enclosing portion is formed of adhesive.

13. The image pickup apparatus according to claim 9, wherein the enclosing portion is formed of a material that is not air-permeable.

14. The image pickup apparatus according to claim 9,
wherein the rear of the barrel has an annular end face facing the cover plate in parallel, and
wherein the enclosing portion is provided between the cover plate and the end face.

15. The image pickup apparatus according to claim 9, wherein the rear of the barrel includes an annular end face facing the cover plate in parallel, and an outer peripheral face projecting from the inner periphery of the end face toward the cover plate.

16. The image pickup apparatus according to claim 9, wherein the cover plate is formed of a transparent glass plate.

17. The image pickup apparatus according to claim 9, further comprising:
a printed wiring board on which the image pickup device is mounted, the printed wiring board being supported in the housing.

18. The image pickup apparatus according to claim 9, further comprising:
a printing wiring board on which the image pickup device is mounted; and
a support wall projecting rearward outside the rear of the barrel in the radial direction and inside the housing,
wherein the image pickup device is bonded to the support wall with adhesive.

* * * * *